000# United States Patent Office 3,810,773
Patented May 14, 1974

3,810,773
STRONG LIGHT WEIGHT, BONDED, POROUS
AGGREGATE
Richard F. Shannon, Lancaster, Ohio, assignor to Owens-Corning Fiberglas Corporation
No Drawing. Filed Dec. 2, 1971, Ser. No. 204,352
Int. Cl. C08h 17/04
U.S. Cl. 106—288 B                    17 Claims

ABSTRACT OF THE DISCLOSURE

A method of bonding light weight porous particles of an aggregate bonded together by a binder that has been made into the form of a gel. The gelatinous binder is mixed with the porous particles so that the gel coats the surface of the particles without appreciably penetrating the pores of the aggregate. Upon curing of the gel coated porous particles, the porous particles are bonded together by surface bonds without any appreciable filling of the pores of the aggregate. The resulting bonded aggregate is strong and light weight, and can be used as a thermal insulation.

BACKGROUND OF THE INVENTION

Molded thermal insulation materials have been made by the bonding together of particles of a porous light weight aggregate, such as expanded perlite and expanded vermiculite, using aqueous dispersions of hardenable binders. Aqueous dispersions of the binder material have been prepared and particles of expanded porous aggregate have been thoroughly mixed therewith and the binder hardened. Various inorganic binders have been used as for example silica sols and alumina sols. One of the difficulties that is experienced with these types of materials is that the sols tend to penetrate the pores of the aggregate, and appreciably increase the density of the finished bonded aggregate material. Inasmuch as the heat conductivity of a given combination of binder and aggregate is a function of its density, the thermal conductivity of the prior art materials is considerably greater than is possible where the pores of the aggregate are not filled with the binder material.

An object of the present invention is the provision of a new and improved method of producing bonded porous aggregates wherein the binder does not appreciably penetrate the voids or pores of the aggregate.

A further object of the present invention is the provision of a new and improved bonded aggregate material having a strength substantially equal to that of the prior materials, and a density appreciably lower than the prior art materials.

DESCRIPTION OF THE PREFERRED EMBODIMENTS

The materials of the present invention are what are called bonded aggregates in which tensile strength is transferred through the particles of aggregate and the bonds connecting the same, rather than through the binder surrounding the aggregate. Such structures are to be distinguished from light weight bonded aggregate mixtures, such as concrete, wherein tensile forces are transferred solely through the binder, and wherein the particles of aggregate function primarily as bulking agents or fillers. Compressive loads, of course, can be transferred through the aggregate in both instances.

Because the strength of the materials of the present invention are dependent upon the sequential transfer of stress from one particle of aggregate to the other through the bonds therebetween, the bond strength achieved by the present invention is much more significant than is the bond in concretes and the like. The present invention is directed to a process for obtaining a high bond strength between the aggregate without filling the pores of the aggregate.

According to the present invention, bonded porous aggregate is prepared by applying the binder for the aggregate to the particles of the aggregate in the form of a gel. The gel coats the outer surface of the particles of porous aggregate, but does not penetrate the pores of the particles of the aggregate unless the binder is worked into the pores of the aggregate with appreciable pressure. The pressure used to force the gelled binder and the aggregate together is controlled to limit the extent to which the binder is worked into the pores. This can be done in various ways as for example by stirring the gel and aggregate together and pressing the mixture into a mold, or can be done by tumbling the gel and aggregate together and pressing the mixture into a mold. The aggregate can be any porous particles the foramina of which are large enough to be penetrated by an aqueous dispersion.

The term "cellular inorganic particles," as used throughout the present specification and claims, is intended to connote particles having a particle density of less than 30 pounds per cubic foot, and which are characterized by a discontinuous structure. Such a cellular or discontinuous nature may be the result of gaseous expansion to form voids within a normally continuous structure, a product of mechanical cellulation or frothing, or the result of the leaching, decomposition or dissolution of a portion of a continuous structure, as when soluble materials are dissolved and washed therefrom, or readily decomposible or combustible materials are decomposed or combusted under conditions which do not affect the remaining portion of the structure. In essence, such materials comprise discontinuous structures having voids which may be formed by various means.

The expanded inorganic material is preferably expanded perlite prepared from perlite rock which normally comprises 65% to 70% silica, 10 to 20% alumina and 2 to 5% water. The desirability of this material is the result of both its highly satisfactory bulk densities, e.g. 2 to 12 p.c.f., its excellent thermal K values, e.g. as low as 0.2–0.5 at an average mean temperature of 75° F., and its ideal compatability with an alumina or silica binder phase. To derive the expanded form, the previously described perlite rock is heated to its softening point, whereupon a fluffy pumice-like, cellular expanded material is derived.

In addition to expanded perlite, the term "expanded or cellular inorganic particles" is intended to encompass and connote other expanded minerals such as expanded vermiculite, and other cellular, siliceous or inorganic compositions such as glass foam, porous clay beads, cellular pumice, expanded clay, cellular diatomite, etc. The preparation of expanded vermiculite is fully disclosed by U.S. 1,963,275, and the material may be described as the expanded form of vermiculite, i.e. volume increased from 5 to 25 times, which results when the latter mineral is heated to temperatures in the range of 2000° C. The mineral subjected to such thermal treatment, conventionally comprises a hydrated magnesium-iron silicate.

The glass foam particles referred to as alternate materials, comprise conventional foamed or cellular glass. Such particles are preferably subjected to a surface fusion or glazing, in order to reduce their porosity. In the event that such porosity is not diminished, excessive quantities of binder may be necessitated by the fact that the binder is absorbed within the particles, to serve no useful purpose and simultaneously increase the density.

For example, suitable foamed glass pellets may be made by crushing into small particles, a glass made from a batch composition comprising:

| | Percent |
|---|---|
| $SiO_2$ | 60 |
| $Al_2O_3$ | 10 |
| CaO | 15 |
| MgO | 5 |
| $B_2O_3$ | 10 | adding 100 parts of the crushed glass particles to 1 part of flake aluminum, 5 parts barytes, and 5 parts gypsum, mixing and grinding the ingredients in a ball mill, admixing 10% water, forming small pellets from the resultant paste, and heating the pellets at 1960° F. for two minutes. Other methods of glass foam preparation are disclosed by U.S. Pats. 2,354,807, 2,480,672, 2,658,096 and 2,691,248. It should be noted that the above described foamed glass pellets are highly satisfactory at temperatures up to 1200° F. However, at higher temperatures it is preferable to convert the glass from an amorphous to a crystalline condition. This may be achieved through either a seeding agent or by thermal treatment. In the former case, a crystalline seeding agent such as rutile is added to the basic batch composition. When this approach is taken the pellets are also possessed of an improved thermal K (heat transmission) since the rutile is an opacifier which acts to curtail radiation. Alternatively, the foamed glass pellets, after the described formation, may be heated at 1500° F. for two hours, to transform them to a crystalline state. During the latter treatment, the pellets undergo substantial shrinkage.

In adlition, hollow unicellular particles such as clay or glass beads may be utilized as the expanded or cellular inorganic particles, or may be combined with materials such as perlite and interbonded to yield the desired type of product.

The diameters of the cellular inorganic particles are preferably in the range of 0.001 to 0.375 inch, depending upon the nature of the material. For example, glass foam pellets having a diameter as great as 0.50 inch may be satisfactorily employed although a diameter of 0.06 inch is preferred.

In the case of expanded perlite, particles having the following sieve characteristics are preferred:

| | Percent perlite retained on screen | |
|---|---|---|
| | Maximum | Minimum |
| Sieve size: | | |
| 20 | 5 | 0 |
| 50 | 65 | 45 |
| 100 | 95 | 75 |

In the case of expanded vermiculite, commercial grade #4 is preferred. The sieve characteristics of that grade are as follows:

| | Percent vermiculite retained on screen | |
|---|---|---|
| | Maximum | Minimum |
| Sieve size: | | |
| 16 | 5 | 0 |
| 30 | 65 | 15 |
| 50 | 98 | 60 |
| 100 | 100 | 90 |

The bulk density of the inorganic particles should be no more than 20 pounds per cubic foot, and preferably no more than 12 pounds per cubic foot, depending upon the availability of a specific material in varying densities. Optimally, the bulk density should be between 2–8 p.c.f., and in the case of expanded perilte 2–5 p.c.f. since the latter material is available in such densities.

The binders that can be used in the present invention can be any type of binder, and preferably an inorganic binder, which can be made into a gel and which will provide tensile and compressive strength. Materials such as silica sols, alumina sols, and salts of Groups II, III, IV, V, and VI metals as for example, calcium, magnesium, aluminum, barium, iron, chromium, titanium and zirconium can be used and can be made into a jelly-like mass by the addition of water and the conversion of the salt into a hydroxide.

When a colloidal system of silica is utilized, it may be prepared by passing a colloidal dispersion of a relatively low concentration of sodium silicate, e.g., 5–10%, through an ion exchange column in the hydrogen form. Alternatively, commercially available colloidal silica systems such as "Ludox" or "Syton" may be employed.

A gel can also be made from an aqueous sodium or potassium silicate dispersion by changing the pH of the solution from 13 to below 4 and preferably below 2 or 3. These aqueous solutions when made have an initial pH above 12. These solutions, however, can be deionized in a hydrogen ion regenerated column to form a silica sol having a pH below 4. This silica sol can be gelled by raising the pH to between 4 and 8. The silica sol having a pH less than 4 can also have its pH changed to above 8 without gelling by pouring it into a solution having a pH above 8 to change the pH instantaneously.

As a colloidal alumina system, the commercial preparation "Baymal" may be utilized. This material comprises minute fibrils of boehmite alumina which forms slightly acidic colloidal sols when dispersed in water or polar solvents, and is disclosed by U.S. Pats. 2,915,475 and 2,917,426. Other colloidal forms of alumina may also be employed, such as alpha or laminar alumina, gamma alumina, diaspore (alpha alumina monhydrate), gibbsite (gamma aluminum hydroxide), bayerite (alpha aluminum hydroxides), and the amorphous alumina gels. It should be noted that when boehmite alumina fibrils are employed as the binder, the starting material is transformed upon heating, from a dispersible to a nondispersible condition, and as curing temperatures are elevated the original boehmite crystal may evolve through gamma alumina, theta alumina, and alpha alumina phases, to ultimately become a dense, sintered form of alpha alumina. However, at the relatively moderate, pre-installation, treating temperatures of the invention, the alumina probably does not progress beyond the gamma alumina form.

In addition, the colloidal materials may be prepared in accordance with U.S. Pat. 2,901,379, wherein an appropriate salt, e.g. aluminum sulphate, is converted to its corresponding hydroxide by means of the addition of ammonium hydroxide. The hydroxide can then be heated to form the oxide.

The colloidal binder is essentially a dispersion of the colloidal particles of oxide in a liquid medium which is preferably water, but which may be other liquid media capable of being dried at suitable temperatures.

The salts of Groups II, III, IV, V, and VI metals which are the most effective as thickenable binders are the amphoteric hydroxides, and particularly hydroxides of calcium, chromium, zinc, magnesium, aluminum, and titanium. Aqueous solutions containing more than about 1% of salts of these metals can be converted to a gel by adding a base such as ammonium hydroxide. These salts will include any soluble salt such as the chloride, sulfate, phosphate, nitrate etc. and the solutions can have from approximately 1% of the salt to the amount in a saturated solution thereof. Concentrations from 5 to 50% by weight give effective gels, and 5–25% by weight are preferred. Ten percent of aluminum, calcium, and magnesium give thick gels whereas slightly more than 10% may be required to give thick gels of the other salts.

A gel can also be made of substantially any nongelling binder by the use of thixotropic gel producing agents such as: "Benagua" (a trademark for a highly beneficiated hydrous magnesium montmorillonite having an average chemical analysis of about 53.7% $SiO_2$, about 24.5%

MgO, and about 12% loss on ignition); "Carbopol" (a cross-linked polyacrylic acid produced according to U.S. Pat. 2,798,053); refined attapulgite $(3MgO \cdot 1.5Al_2O_3 \cdot 8SiO_2 \cdot 9H_2O)$;

"Baymal" alumina (a colloidal alumina disclosed by Pats. 2,915,475 and 2,917,426); silica sols; and Kelco Company "Kelzan" (a polysaccharide gum produced by fermentation of an alginate with anthomonas comphestris bacterium). With all thixotropic agents, the binder and gel forming materials must be mixed with water and the pH properly controlled to produce the gel of the materials. Examples of inorganic binder which can be thickened by other gelling agents include fine dispersions of gypsum, portland cement, clay, phosphates such as monoaluminum phosphate, magnesium oxy chloride, magnesium oxy sulfate, magnesium oxy phosphate, silicates, such as sodium boro silicate, and other inorganic binders. Practically any organic binder prepolymer solution can be gelled as for example, aldehyde condensates such as phenol formaldehyde, polyesters, polyolefins, polyvinyls, polyamides, etc.

The amount of gelled binder used should be sufficient to fill the voids between the particles of the aggregate before drying. Most light weight appregates will have a packing factor between 50% and about 70%, so that the gelled binder used would comprise from 50% to 30% by volume. An excess is preferably used and the excess squeezed out of the aggregate through a 100 mesh screen using a pressure of from 5 p.s.i. up to the crushing pressure of the aggregate, but preferably below 50 p.s.i.

EXAMPLE 1

34 grams of a colloidal silica solution containing 45% solids and having a pH of 4 were placed into a beaker. A solution of ammonium hydroxide was slowly added with stirring to form a thick gel, the pH of which was above 10. 20 grams of a concrete grade perlite having a particle size of approximately 1/32 inch was mixed with the gelled colloidal silica using a spatula. The mixture was then added to a 1" x 4" mold cavity that was 1" deep. A 100 mesh screen was placed over the top and the material pressed together at 5 p.s.i. The mold was dried in an oven at 350° F. for 8 hours. The sample was thereafter removed from the mold as a block that was approximately 10 times stronger than that of a sample prepared with ungelled colloidal silica.

By way of comparison and not according to the invention, 20 grams of the same perlite given above were placed in a beaker and 34 grams of the colloidal silica used above but in an ungelled condition was poured over the top of the perlite and mixed therewith using a spatula. This material was added to a 2" x 4" mold cavity that is 1" high and compressed at 5 p.s.i. pressure as given above. This material when dried at 350° F. for 8 hours, could not be removed from the mold in one piece. The material had a strength that was only approximately 1/10 of the product given above that was made from gelled colloidal silica.

EXAMPLE 2

The process of Example 1 was repeated excepting that a 40% by weight sodium silicate solution, having a 3.22 $SiO_2$ to $Na_2O$ ratio, was used. This material was gelled by bubbling $SO_2$ through the solution until a thick gel was formed. The material prepared had a strength approximately equal to that of the material prepared according to Example 1. The material of Example 1, however, has the advantage that it is less sensitive to water.

EXAMPLE 3

The process of Example 2 was repeated using potassium silicate. This product had substantially the same strength as the product of Example 1, but is more soluble in water.

EXAMPLE 4

20 grams of "Baymal," a colloidal alumina sold by the Du Pont Co., was added to water to give a 10% dispersion. This material is a thick gel and was thereafter added to a mold and dried as given in Example 1 above. The product was an acceptable insulation material.

EXAMPLE 5

40 grams of a monoaluminum phosphate solution having 20% solids by weight was added to a beaker and its pH changed to 10 by bubbling ammonia through the solution. Thereafter 20 grams of perlite was mixed therewith and the mixture placed in a mold using the same procedure as given in Example 1. The product so made was an acceptable insulation material.

EXAMPLE 6

40 grams of an aqueous solution of chromium sulfate containing 25% of chromium sulfate by weight was added to a beaker and gelled by bubbling ammonia through the solution to change its pH to approximately 10. Thereafter 20 grams of 1/4" glass pellets prepared according to the procedure given in Pat. 3,551,274 was added. The glass foam pellets were mixed with the gel using a spatula and the mixture was placed in a mold and dried according to the procedure given in Example 1. The product produced was a strong light weight insulation material.

EXAMPLE 7

The process of Example 6 was repeated excepting that a 20% solution of calcium chloride was gelled and 1/4" vermiculite was used in place of the glass foam pellets. The product so produced was a strong light weight insulation material.

EXAMPLE 8

The process of Example 7 was repeated using a solution having 25% by weight of magnesium sulfate and a strong light weight insulation material was produced.

EXAMPLE 9

The process of Example 6 was repeated using a solution containing 50% of aluminum sulfate by weight, and clay microballoons prepared according to Pat. 2,676,892 were used in place of the glass foam pellets. A strong light weight thermal insulation was produced.

EXAMPLE 10

40 grams of a 5% by weight aqueous solution of zinc sulfate was prepared and gelled using the procedure of Example 1. 20 grams of perlite were added in place of the glass foam pellets and the materials were otherwise processed according to the procedure of Example 6. A light weight thermal insulation material was produced. This material was not as strong as the material of Example 6, however, because the gel contained less solids.

EXAMPLE 11

The process of Example 10 was repeated using a 25% by weight solution of titanium sulfate. The material produced was a strong light weight thermal insulation material having approximately the same strength as that of the material of Example 6.

EXAMPLE 12

The product of Example 7 had a structure wherein the vermiculite is bonded together by a porous network of calcium oxide and calcium hydroxide left by the removal of water from the gelled calcium chloride solution. The product was placed in a container and the outlet of a tube connected to the outlet valve of a carbon dioxide bottle was directed at one side of the material to produce a flow of carbon dioxide through the porous binder network. After the flow of reactive carbon dioxide gas through the material continues for 16 hours, the flexural strength of the product has increased by approximately 10%. The carbon dioxide gas converts at least some of the binder into a form of calcium carbonate.

It will now be apparent that salts of metals from Groups II, III, IV, V, and VI of the Periodic Table can be gelled and used as a binder. Sufficient solids will exist in the gel if the salt is used in an amount greater than 1% by weight, and the solution can be a saturated solution. In general, gels, having from 5% to 50% solids are operable, with gels ranging from 5% to 25% being preferred. Gels having approximately 10% by weight of solids give a thick gel that is optimum in most instances.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

I claim:

1. In the process of producing bonded porous light weight aggregates the preponderance of which have a particle size at least as great as 100 mesh, the improvement comprising: preparing an aqueous mixture consisting essentially of water and of an inorganic binder forming material having a particle size that is less than the pores of the aggregate, converting said aqueous mixture to a flow resistant gel prior to mixing with the aggregate, forcing the particles of aggregate closely adjacent each other with the gel between and into intimate contact with the surfaces of the particles of the porous light weight aggregate to form a body that is 50% by volume or more of aggregate, and transforming the gel into a rigid binder in situ between the particles without reconverting to the liquid phase, and whereby the gel is transformed into a binder which adheres to the surface of the particles of porous aggregate without appreciably filling the pores of the aggregate and thereby raising the weight of the bonded aggregate.

2. The process of claim 1 wherein said transforming step is a drying step, and said drying step is accomplished without disrupting the gel to leave a porous binder.

3. The process of claim 1 wherein said aqueous inorganic binder forming materials which are transformed into a gel comprise from approximately 30% to approximately 50% by volume and are mixed with porous aggregate comprising from approximately 50% to approximately 70% by volume of the composite mixture before drying.

4. In the process of producing bonded porous light weight aggregates the preponderance of which have a particle size at least as great as 100 mesh, the improvement comprising: preparing an aqueous mixture consisting essentially of water and of an inorganic binder forming material having a particle size that is less than the pores of the aggregate, converting said aqueous mixture to a gel prior to mixing with the aggregate, forcing the particles of aggregate closely adjacent each other with the gel between and into intimate contact with the surfaces of the particles of the porous light weight aggregate to form a body that is 50% by volume or more of aggregate, drying the gel to form a rigid binder in situ between the particles without reconverting to the liquid phase, and passing a gas that is reactive with the binder forming material through the pores created by the drying of the gel network to further harden the binder, and whereby the gel is transformed into a binder which adheres to the surface of the particles of porous aggregate without appreciably filling the pores of the aggregate and thereby raising the weight of the bonded aggregate.

5. In the process of producing bonded porous light weight aggregates the preponderance of which have a particle size at least as great as 100 mesh, the improvement comprising: preparing an aqueous mixture consisting essentially of water and of an inorganic binder forming material having a particle size that is less than the pores of the aggregate and consisting essentially of a silica sol gelling agent, converting said aqueous mixture to a gel prior to mixing with the aggregate, forcing the particles of aggregate closely adjacent each other with the gel between and into intimate contact with the surfaces of the particles of the porous light weight aggregate to form a body that is 50% by volume or more of aggregate, and transforming the gel into a rigid binder in situ between the particles without reconverting to the liquid phase, and whereby the gel is transformed into a binder which adheres to the surface of the particles of porous aggregate without appreciably filling the pores of the aggregate and thereby raising the weight of the bonded aggregate.

6. The process of claim 5 wherein the aggregate is perlite and the binder forming material is a silica gel.

7. The process of claim 5 wherein the aggregate is expanded vermiculite and the binder forming material is a silica gel.

8. In the process of producing bonded porous light weight aggregates the preponderance of which have a particle size at least as great at 100 mesh the improvement comprising: preparing an aqueous mixture consisting essentially of water and of an inorganic binder forming material having a particle size that is less than the pores of the aggregate and comprising a gel transformable sol of a salt of a metal from the group consisting of Groups II, III, IV, V and VI metals, converting said aqueous mixture to a gel prior to mixing with the aggregate, forcing the particles of aggregate closely adjacent each other with the gel between and into intimate contact with the surfaces of the particles of the porous light weight aggregate, and transforming the gel into a rigid binder insitu between the particles without reconverting to the liquid phase, and whereby the gel is transformed into a binder which adheres to the surface of the particles of porous aggregate without appreciably filling the pores of the aggregate and thereby raising the weight of the bonded aggregate.

9. The process of claim 8 including the step of: passing a gas that is reactive with the binder forming material through the binder pores created by the drying of the gel network.

10. In a the process of producing bonded porous light weight aggregates the preponderance of which have a particle size at least as great as 100 mesh, the improvement comprising: preparing an aqueous mixture consisting essentially of water and of an inorganic binder forming material having a particle size that is less than the pores of the aggregate and comprising a gel transformable nonaluminum containing aqueous sol of a salt of a metal from a group consisting of Groups II, III, IV, V and VI metals, converting said aqueous mixture to a gel prior to mixing with the aggregate, forcing the particles of aggregate closely adjacent each other with the gel between and into intimate contact with the surfaces of the particles of the porous light weight aggregate, and transforming the gel into a rigid binder insitu between the particles without reconverting to the liquid phase, and whereby the gel is transformed into a binder which adheres to the surface of the particles of porous aggregate without appreciably filling the pores of the aggregate and thereby raising the weight of the bonded aggregate.

11. In the process of producing bonded porous light weight aggregates the preponderance of which have a particle size at least as great as 100 mesh, the improvement comprising: preparing an aqueous mixture consisting essentially of water and of an inorganic binder forming material from the group consisting of gypsum, portland cement, clay, monoaluminum phosphate, magnesium oxy chloride, magnesium oxy sulfate, magnesium oxy phosphate, silicates including silica sols, calcium hydroxide, magnesium hydroxide, barium hydroxide, iron hydroxide, chromium hydroxide, titanium hydroxide and zirconium hydroxide having a particle size that is less than the pores of the aggregate and which is transformable to a gel, converting said aqueous mixture to a gel prior to mixing with the aggregate, forcing the particles of aggregate closely adjacent of each other with the gel between and into intimate contact with the surfaces of the particles of the porous light weight aggregate to form a body that is 50% by volume or more of aggregate, and transforming the gel into a rigid binder insitu between the particles without reconverting to the liquid phase, and whereby the gel is transformed into a binder which adheres to the surface of the particles of porous aggregate without appreciably filling the pores of the aggregate and thereby raising the weight of the bonded aggregate.

12. The process of claim 11 wherein the aggregate comprises glass foam pellets.

13. The process of claim 11 wherein the aggregate comprises expanded clay pellets.

14. The process of claim 11 wherein said gel is a gel of an alkali metal silicate.

15. The process of claim 14 wherein said gel is a gel of sodium silicate.

16. The process of claim 15 wherein said aggregate is perlite.

17. The bonded aggregate prepared by the process of claim 1.

References Cited
UNITED STATES PATENTS

| | | | |
|---|---|---|---|
| 3,353,975 | 11/1967 | Shannon et al. | 106—65 |
| 3,419,495 | 12/1968 | Weldes et al. | 252—62 |

DELBERT E. GANTZ, Primary Examiner

STEPHEN L. BERGER, Assistant Examiner

U.S. Cl. X.R.

106—DIG 2